(12) United States Patent
Sakanushi et al.

(10) Patent No.: US 10,410,632 B2
(45) Date of Patent: Sep. 10, 2019

(54) INPUT SUPPORT APPARATUS AND COMPUTER PROGRAM PRODUCT

(71) Applicants: Kabushiki Kaisha Toshiba, Minato-ku (JP); Toshiba Digital Solutions Corporation, Kawasaki-shi (JP)

(72) Inventors: Keisuke Sakanushi, Mitaka (JP); Yasunari Miyabe, Kawasaki (JP); Shozo Isobe, Kawasaki (JP); Kazuyuki Goto, Kawasaki (JP); Chikashi Sugiura, Hamura (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/714,198

(22) Filed: Sep. 25, 2017

(65) Prior Publication Data

US 2018/0090146 A1 Mar. 29, 2018

(30) Foreign Application Priority Data

Sep. 14, 2016 (JP) ................................ 2016-179894

(51) Int. Cl.
*G06F 17/00* (2019.01)
*G06F 17/20* (2006.01)
(Continued)

(52) U.S. Cl.
CPC ............ *G10L 15/22* (2013.01); *G06F 17/243* (2013.01); *G10L 15/02* (2013.01); *G10L 15/26* (2013.01)

(58) Field of Classification Search
CPC .... G06F 17/2785; G06F 17/246; G06F 17/24; H04N 5/44543; G10L 17/005;
(Continued)

(56) References Cited

U.S. PATENT DOCUMENTS 9,473,637 B1 * 10/2016 Venkatapathy ..... H04M 3/5175
10,014,004 B2 * 7/2018 Khaleghi ................ G10L 25/63
(Continued)

FOREIGN PATENT DOCUMENTS

| JP | 5754177 B2 | 7/2015 |
|---|---|---|
| JP | 5796496 B2 | 10/2015 |
| WO | WO 2017/010506 A1 | 1/2017 |

*Primary Examiner* — Anne L Thomas-Homescu
(74) *Attorney, Agent, or Firm* — Oblon, McClelland, Maier & Neustadt, L.L.P.

(57) ABSTRACT

An input support apparatus of an embodiment includes a template storage unit configured to store a form template that is a template for form data having one or more slots to which item values are input in correspondence with item names, the form template describing item names of the respective slots and alternatives of an alternative type slot in which an item value is selected from a plurality of alternatives together with respective readings thereof; an acquisition unit configured to acquire recognition result data obtained by speech recognition performed on utterance of a user, the recognition result data containing a transcription and a reading; and a determination unit configured to determine the item values to be input to the slots of the form data based on the reading of the recognition result data and the readings of the item names and the alternatives described in the form template.

9 Claims, 13 Drawing Sheets

(51) Int. Cl.
*G06F 17/21* (2006.01)
*G06F 17/22* (2006.01)
*G06F 17/24* (2006.01)
*G06F 17/26* (2006.01)
*G06F 17/28* (2006.01)
*G06F 3/00* (2006.01)
*G10L 15/00* (2013.01)
*G10L 15/04* (2013.01)
*G10L 15/06* (2013.01)
*G10L 17/00* (2013.01)
*G10L 13/08* (2013.01)
*G10L 21/00* (2013.01)
*G10L 25/00* (2013.01)
*G10L 15/22* (2006.01)
*G10L 15/02* (2006.01)
*G10L 15/26* (2006.01)

(58) Field of Classification Search
CPC ....... G10L 17/15; G10L 17/063; G10L 17/00; G10L 17/08; G10L 17/265; G10L 13/08; G06Q 50/24; G06Q 50/22; G06Q 30/04
See application file for complete search history.

(56) References Cited

U.S. PATENT DOCUMENTS

| | | | | |
|---|---|---|---|---|
| 2002/0143533 A1* | 10/2002 | Lucas | ............... | G06F 3/167 704/235 |
| 2003/0144885 A1* | 7/2003 | Sachdev | ............... | G06F 17/243 705/3 |
| 2004/0254791 A1* | 12/2004 | Coifman | ............... | G10L 15/26 704/246 |
| 2005/0015379 A1* | 1/2005 | Aureglia | ............... | G06F 17/246 |
| 2006/0167686 A1* | 7/2006 | Kahn | ............... | G06F 17/2211 704/235 |
| 2007/0156403 A1* | 7/2007 | Coifman | ............... | G10L 15/08 704/252 |
| 2009/0172513 A1* | 7/2009 | Anderson | ............... | G06F 17/211 715/210 |
| 2009/0187407 A1* | 7/2009 | Soble | ............... | G10L 13/00 704/260 |
| 2012/0109686 A1* | 5/2012 | Higbie | ............... | G06Q 50/22 705/3 |
| 2012/0323572 A1* | 12/2012 | Koll | ............... | G10L 15/22 704/235 |
| 2012/0330662 A1* | 12/2012 | Saikou | ............... | G10L 15/183 704/239 |
| 2013/0238330 A1* | 9/2013 | Casella dos Santos | ............... | G10L 15/183 704/235 |
| 2014/0195267 A1* | 7/2014 | Mistry | ............... | G06Q 50/22 705/3 |
| 2016/0110523 A1* | 4/2016 | Francois | ............... | G06Q 50/24 705/2 |
| 2016/0371278 A1* | 12/2016 | Anderson | ............... | G06F 17/30345 |
| 2017/0132397 A1* | 5/2017 | Leitner | ............... | G06F 19/366 |
| 2017/0139895 A1* | 5/2017 | Rosenblum | ............... | G06F 17/248 |
| 2017/0169853 A1* | 6/2017 | Hu | ............... | G11B 27/034 |
| 2017/0235888 A1* | 8/2017 | Rahman | ............... | G06F 17/2785 705/3 |
| 2017/0249592 A1* | 8/2017 | Rossi | ............... | G06F 17/2205 |
| 2017/0286529 A1* | 10/2017 | O'Neill | ............... | G06F 17/30684 |
| 2017/0323061 A1* | 11/2017 | D'Souza | ............... | G06F 17/2705 |
| 2017/0372700 A1* | 12/2017 | Volkov | ............... | G10L 15/26 |
| 2018/0005645 A1* | 1/2018 | Khaleghi | ............... | G10L 15/26 |
| 2018/0033110 A1* | 2/2018 | Sanchez | ............... | G06Q 50/265 |
| 2018/0101727 A1* | 4/2018 | Agrawal | ............... | G06F 17/243 |

* cited by examiner

FIG.1

FORM DATA

No.1 SAGYOU BASYO — B (B1)

No.2 TACHIAI NIN — B (B1)

No.3 KOUKAN BUHIN — B (B1)

B (B2)
No.4 TOKKI JIKOU

```
FORM TEMPLATE                                                          C

┌──────────────────────────────────────────────────────────── B (B1)
  │ No.1
  │
  │ ITEM NAME (READING)   : SAGYOU BASYO (sa-gyo-u-ba-syo, sa-gyo-ou-ba-syo, ba-syo)
  │ SLOT TYPE             : ALTERNATIVE TYPE
  │ ITEM VALUE (READING)  : YOKOHAMA (yo-ko-ha-ma)
  │                         KAWASAKI (ka-wa-sa-ki)
  └────────────────────────────────────────────────────────────

┌──────────────────────────────────────────────────────────── B (B1)
  │ No.2
  │
  │ ITEM NAME (READING)   : TACHIAI NIN (ta-chi-a-i-ni-n, ta-chi-a-i)
  │ SLOT TYPE             : ALTERNATIVE TYPE
  │ ITEM VALUE (READING)  : KAWASAKI (ka-wa-sa-ki)
  │                         NAKAMURA (na-ka-mu-ra)
  │                         TANAKA (ta-na-ka)
  └────────────────────────────────────────────────────────────

┌──────────────────────────────────────────────────────────── B (B1)
  │ No.3
  │
  │ ITEM NAME (READING)   : KOUKAN BUHIN (ko-u-ka-n-bu-hi-n, bu-hi-n)
  │ SLOT TYPE             : ALTERNATIVE TYPE
  │ ITEM VALUE (READING)  : BARUBU (ba-ru-bu)
  │                         RAJIETA (ra-ji-ei-ta, ra-ji-e-ta)
  │                         EAFIRUTA (e-a-fi-ru-ta)
  └────────────────────────────────────────────────────────────

┌──────────────────────────────────────────────────────────── B (B2)
  │ No.4
  │
  │ ITEM VALUE (READING)  : TOKKI JIKOU (to-kki-ji-ko-u, to-kki-ji-ko)
  │ SLOT TYPE             : FREE DESCRIPTION TYPE
  └────────────────────────────────────────────────────────────
```

FIG.3A

UTTERANCE  D

KAWASKI DE EAFIRUTA WO KOUKAN.
TACHIAI NIN WA NAKAMURA SAN.
TOKKI JIKOU DESU GA, IDOU CHU NI FIRUMUIRI HAIKAN NI
TSUMAZUKI KOROBISOU NI NARI MASHITA.

FIG.3B

RECOGNITION RESULT DATA  E

IWASAKI DEWA FIRUTA WO KOUKAN.
TACHIAI NIN WA TAKAMURA SAN.
TOKKI JIKOU DESU GA, IDOU CHU NI FIRUMUIRI HAIKOU NI
TSUMAZUKI KOROBISOU NI NARI MASHITA.

<READING> i-wa-sa-ki-de-wa-fi-ru-ta-wo-ko-u-ka-n.
ta-chi-a-i-ni-n-wa-ta-ka-mu-ra-sa-n.
to-kki-ji-ko-u-de-su-ga-i-do-u-chu-ni-fi-ru-mu-i-ri-ha-i-ko-u-ni-tsu-ma-
zu-ki-ko-ro-bi-so-u-ni-na-ri-ma-shi-ta.

FIG.4

FORM DATA — A

No.1 SAGYOU BASYO
KAWASAKI
B (B1)

No.2 TACHIAI NIN
NAKAMURA
B (B1)

No.3 KOUKAN BUHIN
EAFIRUTA
B (B1)

No.4 TOKKI JIKOU
TOKKI JIKOU DESU GA, IDOU CHU NI FIRUMUIRI HAIKOU NI TSUMAZUKI KOROBISOU NI NARI MASHITA.
B (B2)

FIG.7

| CANDIDATE ID | CANDIDATE TYPE | SLOT No. | ITEM NAME | ITEM VALUE | PARTIAL CHARACTER STRING | OFFSET (POSITION) | DEGREE OF SIMILARITY | SLOT TYPE |
|---|---|---|---|---|---|---|---|---|
| 001 | ITEM VALUE | 1 | SAGYOU BASYO | KAWASAKI | wa-sa-ki | 2 | 0.75 | - |
| 002 | ITEM NAME | 2 | TACHIAI NIN | - | ta-chi-a-i-ni-n | 17 | 1.0 | ALTERNATIVE TYPE |
| 003 | ITEM VALUE | 2 | TACHIAI NIN | KAWASAKI | wa-sa-ki | 2 | 0.75 | - |
| 004 | ITEM VALUE | 2 | TACHIAI NIN | NAKAMURA | ka-mu-ra | 25 | 0.75 | - |
| 005 | ITEM NAME | 3 | KOUKAN BUHIN | - | ko-u-ka-n | 13 | 0.57 | ALTERNATIVE TYPE |
| 006 | ITEM VALUE | 3 | KOUKAN BUHIN | EAFIRUTA | fi-ru-ta | 7 | 0.67 | - |
| 007 | ITEM VALUE | 3 | KOUKAN BUHIN | EAFIRUTA | fi-ru | 46 | 0.5 | - |
| 008 | ITEM NAME | 4 | TOKKI JIKOU | - | to-kki-ji-ko-u | 30 | 1.0 | FREE DESCRIPTION TYPE |

F

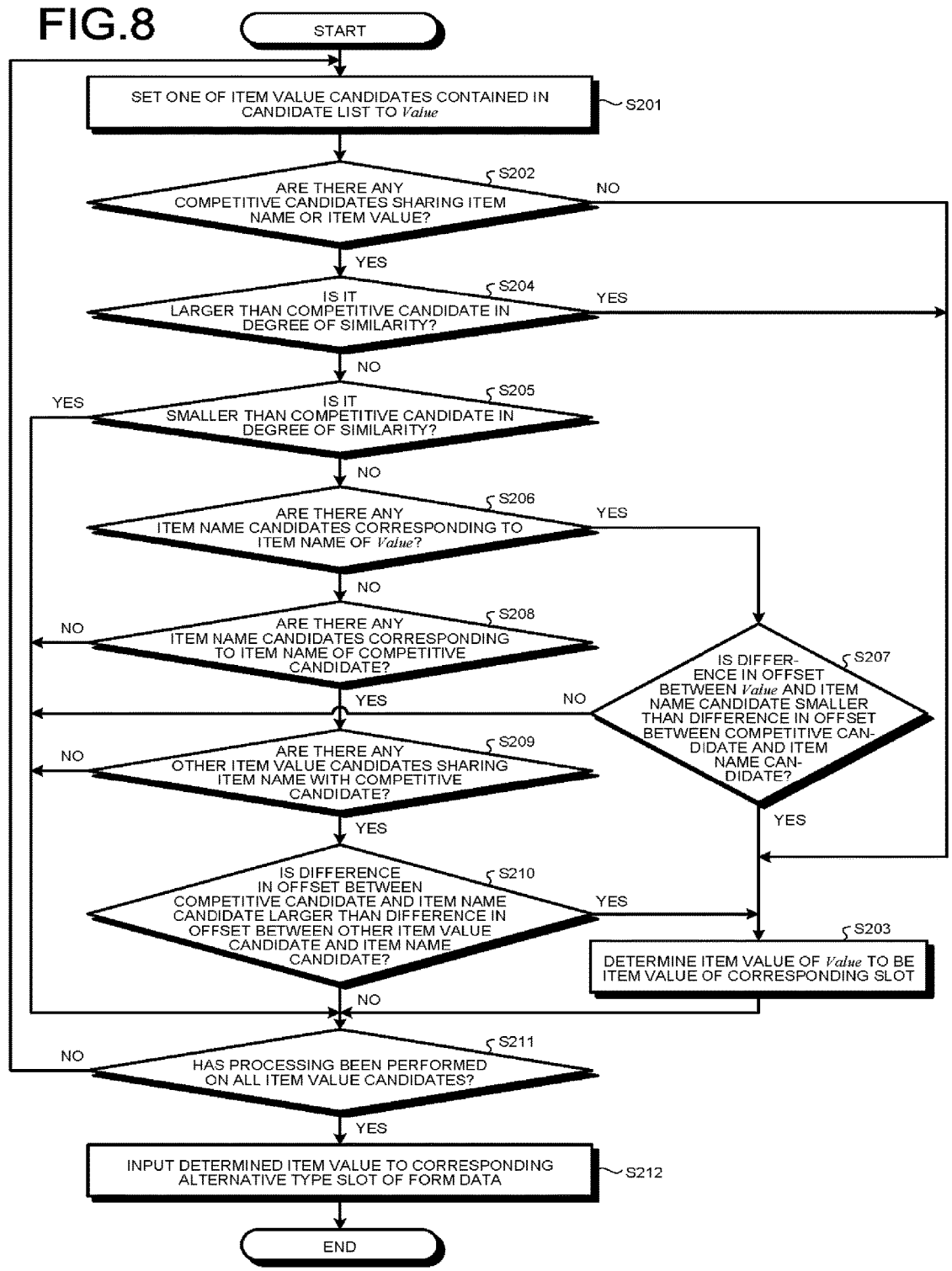

FIG.11

FORM DATA

No.1 SAGYOU JIKAN

30 PUN

~B (B1)

No.2 KOUKAN BUHIN

~B (B1)

No.3 CHUI JIKOU

CHUI JIKOU WA, BARUBU WA KOUKAN SHITE IMASEN.

FORM TEMPLATE ⌐C

⌐B (B1)
```
No.1

ITEM NAME (READING)   : SAGYOU JIKAN (sa-gyo-u-ji-ka-n)
SLOT TYPE             : ALTERNATIVE TYPE
ITEM VALUE (READING)  : 30 PUN (sa-n-jyu-ppu-n)
                        1 JIKAN (i-chi-ji-ka-n)
```

⌐B (B1)
```
No.2

ITEM NAME (READING)   : KOUKAN BUHIN (ko-u-ka-n-bu-hi-n, bu-hi-n)
SLOT TYPE             : ALTERNATIVE TYPE
ITEM VALUE (READING)  : EAFIRUTA (e-a-fi-ru-ta)
                        ICHIJIGAWA HAIKAN (i-chi-ji-ga-wa-ha-i-ka-n)
```

⌐B (B2)
```
No.3

ITEM NAME (READING)   : CHUI JIKOU (chu-u-i-ji-ko-u, chu-u-i)
SLOT TYPE             : FREE DESCRIPTION TYPE
```

FIG.13

RECOGNITION RESULT DATA ⌐E

```
<TRANSCRIPTION>
┌─────────────────────────────────────────────────┐
│ ICHIJIKAN WO CHUI SHITE KOUKAN SHIMASHITA.      │
└─────────────────────────────────────────────────┘

<READING>
┌─────────────────────────────────────────────────────────────┐
│ I-chi-ji-ka-n-wo-chu-u-i-shi-te-ko-u-ka-n-shi-ma-shi-ta.   │
└─────────────────────────────────────────────────────────────┘
```

INPUT SUPPORT APPARATUS AND COMPUTER PROGRAM PRODUCT

CROSS-REFERENCE TO RELATED APPLICATIONS

This application claims the benefit of the right of priority which is restored under 37 CFR 1.55(c) and which is based on the prior Japanese Patent Application No. 2016-179894, filed on Sep. 14, 2016, the entire contents of which are incorporated herein by reference.

FIELD

Embodiments described herein relate generally to an input support apparatus and a computer program product.

BACKGROUND

Conventionally known is a technique that supports input operation by users using a speech recognition technique. Speech recognition engines performing speech recognition are broadly divided into a grammar type and a dictation type. The grammar type is a mode that performs speech recognition based on rules (grammar) created in advance, which is characterized in that utterance that does not follow the rules cannot be recognized, although recognition accuracy is easily improved. In addition, expert knowledge about speech recognition is required for the creation of the rules, and there is a drawback in that work for appropriately creating and managing the rules is complicated. The dictation type is a method that successively recognizes arbitrary utterance independent of specific rules, which is characterized in that it is lower in recognition accuracy than the grammar type, although it is high in versatility.

Now consider supporting operation to input item values to slots of form data by the speech recognition technique. The form data in the present specification refers to data with a given format and having one or more slots to which item values are input in correspondence with item names. When input to the form data of a work report by a worker who has performed field work is supported, for example, it is not realistic to expect all users to utter based on rules, and it is considered that the dictation type speech recognition engine is desirably used for the speech recognition of utterance. However, the dictation type speech recognition engine is low in recognition accuracy as described above, and frequently it cannot be determined that any part of a recognition result should be input as any specific slot's item value. Given these circumstances, desirably provided is a new technique that can appropriately determine the item values to be input to the slots of the form data even when the recognition result contains errors.

BRIEF DESCRIPTION OF THE DRAWINGS

FIG. 1 is a diagram of an example of form data;
FIG. 2 is a diagram of an example of a form template;
FIG. 3A is a diagram of an example of utterance for the creation of a work report by a worker who has performed field work;
FIG. 3B illustrates an example of recognition result data obtained by speech recognizing the utterance of FIG. 3A with a speech recognition engine;
FIG. 4 is a diagram of an example of the form data to which item values have been input;
FIG. 7 is a diagram of an example of a candidate list;
FIG. 8 is a flowchart of an example of a processing procedure by an alternative type item value determination unit;
FIG. 11 is a diagram of an example of the form data in which item values of partial slots have already been input;
FIG. 12 is a diagram of an example of the form template;
FIG. 13 is a diagram of an example of the recognition result data.

DETAILED DESCRIPTION

Figure 5:
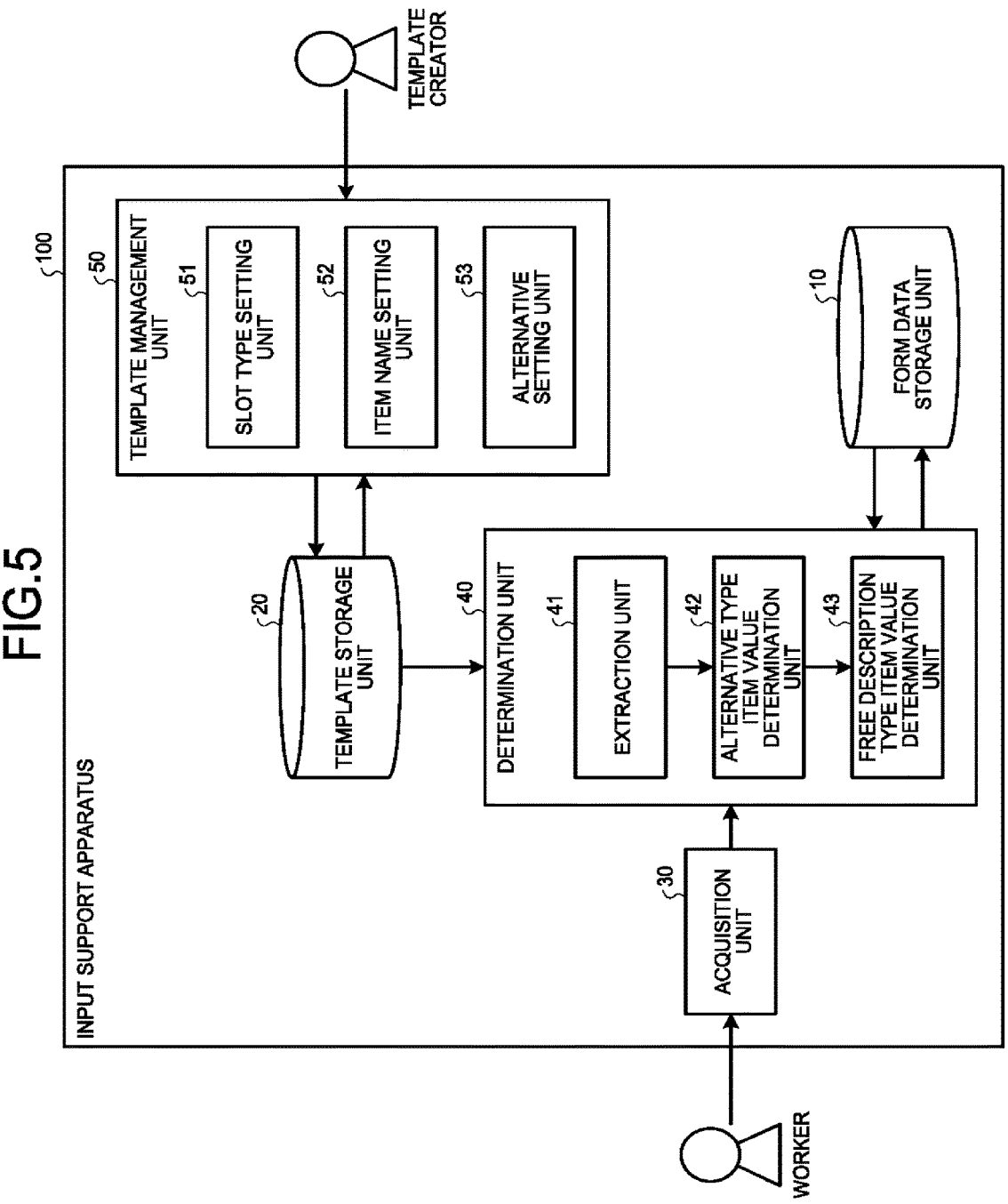
FIG. 5 is a block diagram of a functional configuration example of an input support apparatus.

An input support apparatus of an embodiment includes a template storage unit, an acquisition unit, and a determination unit. The template storage unit stores a form template that is a template for form data having one or more slots to which item values are input in correspondence with item names, the form template describing item names of the respective slots and alternatives of an alternative type slot in which an item value is selected from a plurality of alternatives together with respective readings thereof. The acquisition unit acquires recognition result data obtained by speech recognition performed on utterance of a user, the recognition result data containing a transcription and a reading. The determination unit determines the item values to be input to the slots of the form data based on the reading of the recognition result data and the readings of the item names and the alternatives described in the form template.

The following describes an input support apparatus and a computer program product of an embodiment in detail with reference to the accompanying drawings.

Outline of Embodiment

The input support apparatus of the present embodiment determines the item values to be input to the slots of the form data using the recognition result data obtained by speech recognizing the utterance of the user. It is assumed that a speech recognition engine of a dictation type that enables speech recognition independent of specific rules for the speech recognition for the utterance of the user is used and that the recognition result data contains errors. To appropriately determine the item values to be input to the slots of the form data from such recognition result data containing errors, the present embodiment uses a form template created by a template creator in advance. Although the following exemplifies form data of a work report for reporting work results of field work as form data to be processed, applicable form data is not limited to this example.

The form data is data with a given format and has one or more slots to which item values are input in correspondence with item names. FIG. 1 illustrates an example of the form data. The form data A illustrated in FIG. 1 is an example of the form data of a work report in which the item values are still not input and has four slots B including a slot (slot No. 1) with an item name of "SAGYOU BASYO" (which means working site), a slot (slot No. 2) with an item name of "TACHIAI NIN" (which means observer), a slot (slot No. 3) with an item name of "KOUKAN BUHIN" (which means replacement part), and a slot (slot No. 4) with an item name of "TOKKI JIKOU" (which means special note).

The slot B includes two types: an alternative type slot B1 and a free description type slot B2. The alternative type slot B1 is a slot B for which the item value is selected from a plurality of alternatives. The free description type slot B2 is a slot B in which the item value is freely written. In the form data A exemplified in FIG. 1, each of the three slots B from slot No. 1 to slot No. 3 is the alternative type slot B1, whereas the slot B of slot No. 4 is the free description type slot B2. Character strings based on the utterance of a worker are input as the item values of the respective slots B.

The form template is a template of the form data A and describes the item names of the respective slots B of the form data A and alternatives of the item value of the alternative type slot B1 together with respective readings (the readings are assumed to be hiragana but are replaced with small Roman letters to be written) thereof. FIG. 2 illustrates an example of the form template. This form template C illustrated in FIG. 2 is an example of the form template corresponding to the form data A exemplified in FIG. 1 and describes the item name and the alternatives of the item value together with the respective readings thereof for each of the three alternative type slots B1 from slot No. 1 to slot No. 3 and describes the item name together with the reading thereof for the free description type slot B2 of slot No. 4. A plurality of readings may be described for one item name or alternative. In addition, this form template C describes a slot type indicating either the alternative type or the free description type for each of the slots B.

As described above, the form template C is created by the template creator in advance. The form template C is used as clue information for determining the item values to be input to the respective slots B of the form data A from the recognition result data containing errors but does not need any detailed parameter setting about speech recognition as in rule creation in the grammar type speech recognition engine. In other words, the template creator can easily create the form template C simply by setting the item names of the respective slots B of the corresponding form data A and the alternatives of the alternative type slot B1 together with the readings and also its management becomes easy even without expert knowledge about speech recognition.

FIG. 3A illustrates an example of utterance D for the creation of a work report by a worker who has performed field work, and FIG. 3B illustrates an example of recognition result data E obtained by speech recognizing the utterance D of FIG. 3A with a speech recognition engine. As illustrated in FIG. 3B, the recognition result data E contains a transcription and a reading. In the example illustrated in FIG. 3A and FIG. 3B, "KAWASAKI" of the utterance D and "EAFIRUTA" (which means air filter) of the utterance D are falsely recognized as "IWASAKI" and "DEWA FIRUTA," respectively, and thus the recognition result data E contains errors.

For the reading of the recognition result data E, not the speech recognition engine, a reading information generation unit that generates a reading from the description of the recognition result data E output from the speech recognition engine may be separately provided, and the output of this reading information generation unit may be used. Although the utterance D containing a plurality of sentences as in FIG. 3A is input to the speech recognition engine at a time to obtain the recognition result data E as in FIG. 3B in the present embodiment, the timing of speech recognition may be freely set; each sentence contained in the utterance D may be successively input to the speech recognition engine to perform speech recognition in real time, for example.

The input support apparatus of the present embodiment acquires the recognition result data E exemplified in FIG. 3B, for example, and determines the item values to be input to the respective slots B of the form data A exemplified in FIG. 1 based on the reading of this recognition result data E and the readings of the item names and the alternatives described in the form template C exemplified in FIG. 2. FIG. 4 illustrates an example of the form data A to which the item values determined by the input support apparatus of the present embodiment have been input. As illustrated in FIG. 4, by the processing by the input support apparatus of the present embodiment, "KAWASAKI" is input as an item value to the alternative type slot B1 (slot No. 1) with an item name of "SAGYOU BASYO," "NAKAMURA" is input as an item value to the alternative type slot B1 (slot No. 2) with an item name of "TACHIAI NIN," and "EAFIRUTA" is input as an item value to the alternative type slot B1 (slot No. 3) with an item name of "KOUKAN BUHIN." In addition, "TOKKI JIKOU DESU GA, IDOU CHU NI FIRUMUIRI HAIKOU NI TSUMAZUKI KOROBISOU NI NARI MASHITA" is input as an item value to the free description type slot B2 with an item name of "TOKKI JIKOU."

The reading of the recognition result data E contains "wa-sa-ki" similar to the reading "ka-wa-sa-ki" of the alternative "KAWASAKI" described in the form template C, and the item value "KAWASAKI" input to the alternative type slot B1 (slot No. 1) with an item name of "SAGYOU BASYO" is selected as the item value of this alternative type slot B1. However, "KAWASAKI" is also contained in the alternatives of the alternative type slot B1 (slot No. 2) with an item name of "TACHIAI NIN," and it is necessary to determine which item value of the alternative type slot B1 of slot No. 1 and slot No. 2 "KAWASAKI" corresponding to "wa-sa-ki" is to be selected. In addition, the reading of the recognition result data E contains "ka-mu-ra" similar to the reading "na-ka-mu-ra" of the alternative "NAKAMURA" described in the form template C, and the item value "NAKAMURA" input to the alternative type slot B1 (slot No. 2) with an item name of "TACHIAI NIN" is selected as the item value of this alternative type slot B1. However, the alternatives of the alternative type slot B1 (slot No. 2) with an item name of "TACHIAI NIN" also contain "KAWASAKI" corresponding to "wa-sa-ki" contained in the reading of the recognition result data E, and it is necessary to determine which of "NAKAMURA" and "KAWASAKI" is to be the item value of the alternative type slot B1 of slot No. 2. Even when there are thus a plurality of competing candidates for the item value to be input to the slot B, the input support apparatus of the present embodiment can appropriately determine the item value to be input to each of the slots B.

Specific Example of Input Support Apparatus

The following describes a specific example of the input support apparatus of the present embodiment in detail. FIG. 5 is a diagram of a functional configuration example of an input support apparatus 100 of the present embodiment. As illustrated in FIG. 5, for example, the input support apparatus 100 of the present embodiment includes a form data storage unit 10, a template storage unit 20, an acquisition unit 30, a determination unit 40, and a template management unit 50.

The form data storage unit 10 stores therein the form data A. In accordance with the creation of the form template C (refer to FIG. 2) by the template creator, the form data A in which the item values are still not input (refer to FIG. 1) corresponding to this form template C is generated and is stored in the form data storage unit 10, for example. The item values determined by the determination unit 40 are input to the respective slots B of the form data A stored by the form data storage unit 10, whereby the form data A in which the item values have been input (refer to FIG. 4) is generated. The form data A in which the item values have been input is read from the form data storage unit 10 as needed and can be output with any output mode such as displaying by a display, printing out to recording paper, or data transmission to an external apparatus.

The template storage unit 20 stores therein the form template C. The template creator can create the form template C using the template management unit 50, and the form template C created by this template creator is stored in the template storage unit 20. The form template C stored by the template storage unit 20 is read by the determination unit 40. When the template storage unit 20 stores therein a plurality of form templates C, the determination unit 40 may select a form template C to be read from the template storage unit 20 in accordance with user's operation that selects a form template C to be used or in accordance with the degree of match with the recognition result data E acquired by the acquisition unit 30, for example. The template creator can also edit or delete the form templates C stored by the template storage unit 20 using the template management unit 50.

The acquisition unit 30 acquires the recognition result data E (refer to FIG. 3) obtained by voice recognizing the utterance of a user (the worker who has performed the field work in the present embodiment) by the speech recognition engine. The recognition result data E to be acquired by the acquisition unit 30 contains a transcription and a reading as described above. The acquisition unit 30 may receive input of speech from the user and perform speech recognition using an internal speech recognition engine on the input speech to acquire the recognition result data E or acquire the recognition result data E obtained by speech recognizing the speech from the user by an external speech recognition engine. In other words, the speech recognition engine that performs speech recognition on the speech from the user may be included in the input support apparatus 100 of the present embodiment or included in an apparatus outside the input support apparatus 100 such as a terminal apparatus used by the user or an external server that provides speech recognition service. The recognition result data E acquired by the acquisition unit 30 is delivered to the determination unit 40.

The determination unit 40 determines the item values to be input to the respective slots B of the form data A based on the reading of the recognition result data E acquired by the acquisition unit 30 and the readings of the item names and the alternatives described in the form template C read from the template storage unit 20. As illustrated in FIG. 5, the determination unit 40 includes an extraction unit 41, an alternative type item value determination unit 42, and a free description type item value determination unit 43 and performs processing in this order.

The extraction unit 41 extracts a partial character string similar to the reading of any of the item names or the alternatives described in the form template C from the character string of the reading of the recognition result data E acquired by the acquisition unit 30. The extraction unit 41 then registers a combination of the partial character string extracted from the character string of the reading of the recognition result data E and any of the item names or the alternatives of the form template C used for the extraction of the partial character string as a candidate for a corresponding part between the recognition result data E and the form template C in a candidate list. The details of the candidate list will be described below.

Figure 6:
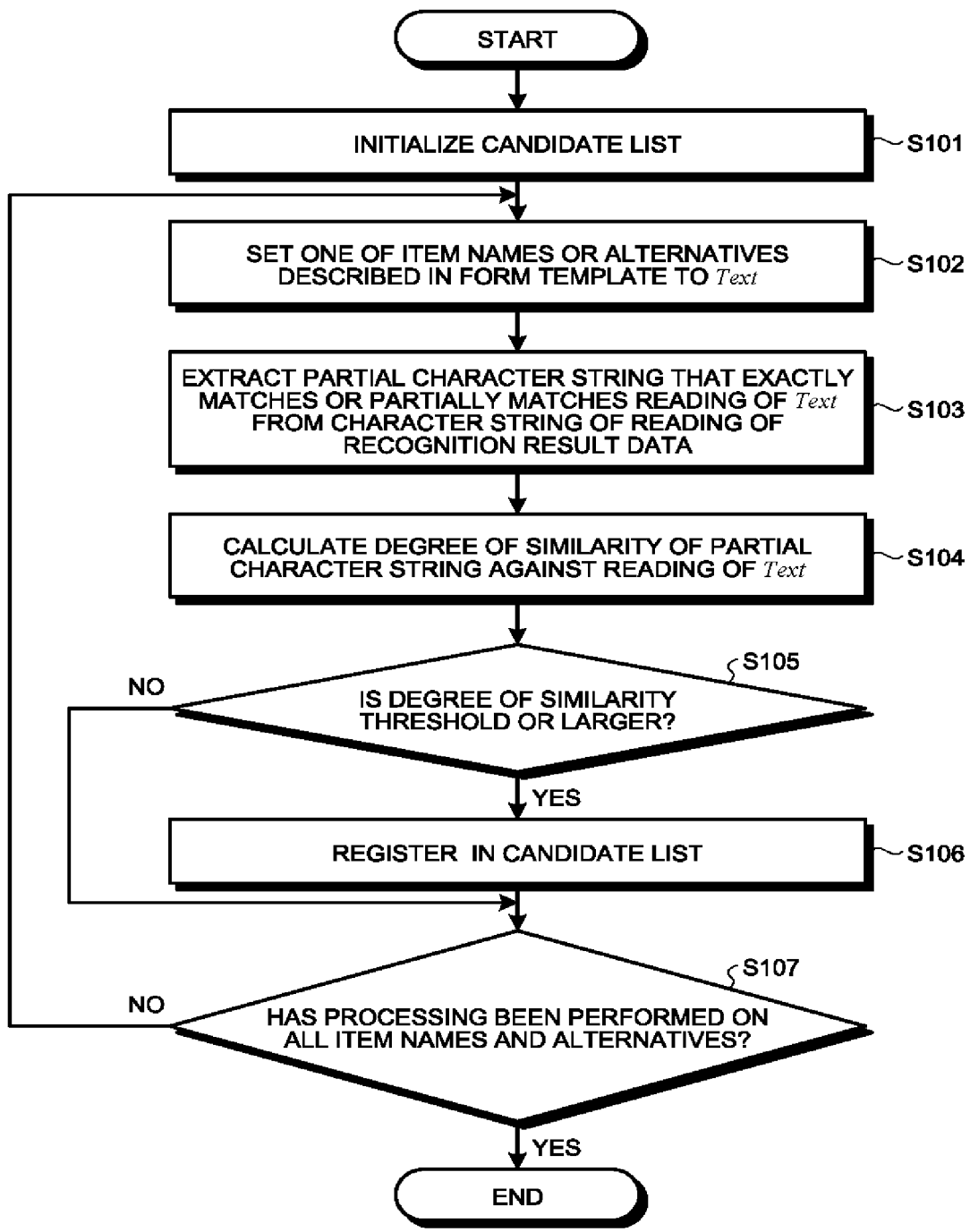
FIG. 6 is a flowchart of an example of a processing procedure by an extraction unit.

FIG. 6 is a flowchart of an example of a processing procedure by the extraction unit 41. When the processing illustrated in FIG. 6 starts, the extraction unit 41 first initializes the candidate list (Step S101). Next, the extraction unit 41 sets one of the item names or one of the alternatives described in the form template C to a variable Text (Step S102). In this process, the reading of the item name or the alternative set to the variable Text is also held.

Next, the extraction unit 41 extracts a partial character string that exactly matches or partially matches the reading of Text from the character string of the reading of the recognition result data E (Step S103). In this process, the extraction unit 41 may perform the processing at Step S103 after performing preprocessing on the recognition result data E in which the preprocessing includes removing fillers or removing parts other than parts estimated to be nouns by morphological analysis, for example. The extraction unit 41 then calculates the degree of similarity against the reading of Text for the partial character string extracted at Step S103 (Step S104). If a plurality of partial character strings have been extracted at Step S103, the degree of similarity is calculated for each of the partial character strings at Step S104.

Examples of the degree of similarity used in this example include the ratio of the number of characters of the partial character string to the number of characters of the reading of Text. When the alternative "EAFIRUTA" of slot No. 3 of the form template C illustrated in FIG. 2 has been set to Text, for example, "fi-ru-ta" (the first line) and "fi-ru" (the third line) that partially match the reading "e-a-fi-ru-ta" of the alternative "EAFIRUTA" are extracted from the character string of the reading of the recognition result data E illustrated in FIG. 3B. In this case, the number of characters of "e-a-fi-ru-ta" in hiragana is six, the number of characters of "fi-ru-ta" in hiragana is four, and the number of characters of "fi-ru" in hiragana is three; therefore, the degree of similarity of "fi-ru-ta" is calculated to be 4/6=0.67, whereas the degree of similarity of "fi-ru" is calculated to be 3/6=0.5. Thus, for the extracted partial character string, as it is more similar to the reading of Text, the degree of similarity having a larger value is calculated.

The method for calculating the degree of similarity is not limited to the above example, and known techniques can be used; the degree of similarity may be calculated using the Levenshtein distance (how many times of operations including insertion, deletion, and replacement of a character are required to be performed to make two character strings the same character string) or the matching rate of N-gram (a continuous element of a combination of N character strings or words adjacent to each other in a character string), for example.

Next, the extraction unit 41 determines whether the degree of similarity calculated at Step S104 is a preset threshold (0.5, for example) or larger for the partial character string extracted at Step S103 (Step S105). If the degree of similarity of the partial character string is the threshold or larger (Yes at Step S105), the extraction unit 41 registers a combination of the partial character string and the item name or the alternative set to Text as a candidate in the candidate list (Step S106).

In contrast, if the degree of similarity of the partial character string is smaller than the threshold (No at Step S105), the processing at Step S106 is skipped, and the registration in the candidate list is not performed. Only the partial character string the degree of similarity of which is the threshold or larger is thus registered in the candidate list, whereby a short partial character string the number of characters in hiragana of which is one or two, for example, can be excluded from the candidate, and inconvenience in which the processing is complicated due to an enormous number of candidates can be effectively avoided.

Subsequently, the extraction unit 41 determines whether the processing has been performed on all the item names and alternatives described in the form template C (Step S107), and if there are some unprocessed item names or alternatives (No at Step S107), the process returns to Step S102 to repeat the subsequent pieces of processing. After performing the pieces of processing from Step S102 to Step S106 on all the item names and alternatives described in the form template C (Yes at Step S107), the series of processing illustrated in FIG. 6 ends.

FIG. 7 is a diagram of an example of a candidate list F generated by the above-described processing by the extraction unit 41. The candidate list F illustrated in FIG. 7 is an example of the candidate list F generated based on the form template C illustrated in FIG. 2 and the recognition result data E illustrated in FIG. 3B. The candidate list F registers a combination of the partial character string extracted from the character string of the reading of the recognition result data E and the item name or the alternative of the form template C used for the extraction of the partial character string as a candidate. As illustrated in FIG. 7, for example, the registration data of the candidate list F contains candidate type, slot No., item name, item value, partial character string, offset, the degree of similarity, and slot type.

The candidate type indicates a type in which the candidate is targeted at either the item name or the alternative (the item value). The slot No. indicates a slot B at which the candidate is targeted. The item name indicates the item name of the corresponding slot B. The item value indicates the alternative (the item value) when the candidate is one targeted at the alternative (the item value). The offset indicates the occurrence position of the partial character string (hiragana) in the recognition result data E and indicates what number the top character of the partial character string is from the top of the character string of the reading of the recognition result data E. The degree of similarity indicates the degree of similarity calculated at Step S104 in FIG. 6. The slot type indicates a type in which the corresponding slot B is either the alternative type slot B1 or the free description type slot B2 when the candidate is one targeted at the item name. The registration data of the respective candidates containing these pieces of information are stored in correspondence with a candidate ID uniquely assigned to each of the candidates. In the following, among the candidates registered in the candidate list F, the candidate targeted at the alternative (the item value) (the candidate the candidate type of which is the item value) will be called an "item value candidate," whereas the candidate targeted at the item name (the candidate the candidate type of which is the item name) will be called an "item name candidate."

The processing by the extraction unit 41 illustrated in FIG. 6 and the configuration of the candidate list F illustrated in FIG. 7 are by way of example and are not limited to these examples. The extraction unit 41 is only required to extract the partial character string similar to the reading of any of the item names or the alternatives in the form template C from the character string of the reading of the recognition result data E and registers the partial character string in the candidate list F. The candidate list F is only required to be configured to make the corresponding relation between the partial character strings extracted by the extraction unit 41 and the item names or the alternatives understandable. When the template storage unit 20 stores therein a plurality of form templates C, the candidate list F may store therein the respective pieces of registration data in correspondence with a template ID that identifies a used form template C in addition to the candidate ID.

The alternative type item value determination unit 42 determines the item value to be input to the alternative type slot B1 of the form data A based on at least either the degree of similarity of the partial character string similar to the reading of any of the alternatives described in the form template C or the positional relation between the partial character string and another partial character string.

FIG. 8 is a flowchart of an example of a processing procedure by the alternative type item value determination unit 42. When the processing illustrated in FIG. 8 starts, the alternative type item value determination unit 42 first sets one of the item value candidates contained in the candidate list F to a variable Value (Step S201).

Next, the alternative type item value determination unit 42 determines whether there are any competitive candidates sharing the item name or the item value for the item value candidate set to Value (Step S202). When the item value candidate of the candidate ID "001" of the candidate list F illustrated in FIG. 7 is set to Value, for example, the item value candidate of the candidate ID "003" sharing the item value "KAWASAKI" is a competitive candidate. When the item value candidate of the candidate ID "003" is set to Value, the item value candidate of the candidate ID "001" sharing the item value "KAWASAKI" and the item value candidate of the candidate ID "004" sharing the item name "TACHIAI NIN" are competitive candidates. When the item value candidate of the candidate ID "006" is set to Value, the item value candidate of the candidate ID "007" sharing the item value "EAFIRUTA" is a competitive candidate. When the item value candidate of the candidate ID "007" is set to Value, the item value candidate of the candidate ID "006" sharing the item value "EAFIRUTA" is a competitive candidate.

As a result of the determination at Step S202, if there is no competitive candidate (No at Step S202), the alternative type item value determination unit 42 determines the item value of Value to be the item value of the corresponding slot B (Step S203). In contrast, if there is a competitive candidate (Yes at Step S202), the alternative type item value determination unit 42 then determines whether the degree of similarity of Value is larger than the degree of similarity of the competitive candidate (Step S204). If the degree of similarity of Value is larger than the degree of similarity of the competitive candidate (Yes at Step S204), the process advances to Step S203 to determine the item value of Value to be the item value of the corresponding slot B. When the item value candidate of the candidate ID "006" in FIG. 7 is set to Value, for example, the degree of similarity of Value 0.67 is larger than the degree of similarity of the item value candidate of the candidate ID "007" as the competitive candidate 0.5, and the item value of Value "EAFIRUTA" is determined to be the item value of the alternative type slot B1 of slot No. 3.

In contrast, if the degree of similarity of Value is not larger than the degree of similarity of the competitive candidate (No at Step S204), the alternative type item value determination unit 42 then determines whether the degree of similarity of Value is smaller than the degree of similarity of the competitive candidate (Step S205). If the degree of similarity of Value is smaller than the degree of similarity of the competitive candidate (Yes at Step S205), the processing on the item value candidate set to Value ends, and the process advances to Step S211 described below.

If the degree of similarity of Value is not smaller than the degree of similarity of the competitive candidate, in other words, if the degree of similarity of Value is equal to the degree of similarity of the competitive candidate (No at Step S205), the alternative type item value determination unit 42 then determines whether there are any item value candidates corresponding to the item name of Value (Step S206). If there is an item name candidate corresponding to the item name of Value (Yes at Step S206), the alternative type item value determination unit 42 then determines whether the difference in offset between Value and the item name candidate is smaller than the difference in offset between the competitive candidate and the item name candidate (Step S207), and if the difference in offset is smaller than that of the competitive candidate (Yes at Step S207), the process advances to Step S203 to determine the item value of Value to be the item value of the corresponding slot B.

When the item value candidate of the candidate ID "004" in FIG. 7 is set to Value, for example, the item name candidate of the candidate ID "002" corresponding to the item value of Value "TACHIAI NIN" exists, and the difference in offset of Value relative to this item value candidate is 8 (=25−17), whereas the difference in offset of the competitive candidates (the item value candidate of the candidate ID "001" and the item name candidate of the candidate ID "003") relative to this item name candidate is 15 (=17−2); the difference in offset is smaller than that of the competitive candidate. Consequently, the item value of Value "NAKAMURA" is determined to be the item value of the alternative type slot B1 of slot No. 2.

In contrast, if the difference in offset between Value and the item name candidate is equal to or larger than the difference in offset between the competitive candidate and the item name candidate (No at Step S207), the processing on the item value candidate set to Value ends, and the process advances to Step S211 described below.

If there is no item name candidate corresponding to the item name of Value (No at Step S206), the alternative type item value determination unit 42 then determines whether there are any item name candidates corresponding to the item name of the competitive candidate (Step S208). If there is an item name candidate corresponding to the item name of the competitive candidate (Yes at Step S208), the alternative type item value determination unit 42 then determines whether there are any other item value candidates sharing the item name with the competitive candidate (Step S209). If there is such an item value candidate (Yes at Step S209), the alternative type item value determination unit 42 then determines whether the difference in offset between the competitive candidate and the item name candidate is larger than the difference in offset between the other item value candidate and the item name candidate (Step S210), and if the difference in offset between the competitive candidate and the item name candidate is larger than the difference in offset between the other item value candidate and the item name candidate (Yes at Step S210), the process advances to Step S203 to determine the item value of Value to be the item value of the corresponding slot B.

When the item value candidate of the candidate ID "001" in FIG. 7 is set to Value, for example, the item name candidate of the candidate ID "002" exists as the item name candidate corresponding to the item name of the item value candidate of the candidate ID "003" as the competitive candidate. In addition, the item value candidate of the candidate ID "004" exists as the other item value candidate sharing the item name with the item value candidate of the candidate ID "003" as the competitive candidate. The difference in offset between the item value candidate of the candidate ID "003" as the competitive candidate and the item name candidate of the candidate ID "002" is 15 (=17−2), whereas the difference in offset between the item value candidate of the candidate ID "004" as the other item value candidate and the item name candidate of the candidate ID "002" is 8 (=25−17); the difference in offset between the competitive candidate and the item name candidate is larger than the difference in offset between the other item value candidate and the item name candidate. Consequently, the item value of Value "KAWASAKI" is determined to be the item value of the alternative type slot B1 of slot No. 1.

If there is no item value candidate corresponding to the item name of the competitive candidate (No at Step S208), if there is no other item value candidate sharing the item name with the competitive candidate (No at Step S209), or if the difference in offset between the competitive candidate and the item name candidate is equal to or smaller than the difference in offset between the other item value candidate and the item name candidate (No at Step S210), the processing on the item value candidate set to Value ends, and the process advances to Step S211.

Subsequently, the alternative type item value determination unit 42 determines whether the processing has been performed on all the item value candidates contained in the candidate list F (Step S211), and if there are some unprocessed item value candidates (No at Step S211), the process returns to Step S201 to repeat the subsequent pieces of processing. After performing the pieces of processing from Step S201 to Step S210 on all the item value candidates contained in the candidate list F (Yes at Step S211), the determined item value is input to the corresponding alternative type slot B1 of the form data A (Step S212), and the series of processing illustrated in FIG. 8 ends.

The alternative type item value determination unit 42 performs the foregoing processing, whereby "KAWASAKI" is input as the item value to the alternative type slot B1 of slot No. 1 of the form data A as illustrated in FIG. 4, for example. "NAKAMURA" is input as the item value to the alternative type slot B1 of slot No. 2. "EAFIRUTA" is input as the item value to the alternative type slot B1 of slot No. 3.

The processing by the alternative type item value determination unit 42 illustrated in FIG. 8 is by way of example and is not limited to this example. The alternative type item value determination unit 42 is only required to determine the item value of the alternative type slot B1 based on at least either the degree of similarity of the item value candidate (the degree of similarity of the partial character string contained in the item value candidate relative to the item value) or the positional relation between the item value candidate and the other item value candidate or the item name candidate (the difference in offset between the partial character strings contained in the respective candidates). Although the above-described example gives priority to the magnitude of the degree of similarity in the comparison with the competitive candidate, for example, scores for the respective candidates may be calculated by comprehensively determining the degree of similarity and the positional relation to determine the item value of the alternative type slot B1 based on the scores of the respective candidates. Although the above-described example represents the positional relation between the candidates using the difference in offset between the partial character strings contained in the respective candidates, the positional relation between the candidates may be represented using another indicator such as the number of other candidates present between two candidates, for example.

The free description type item value determination unit 43 determines the item value to be input to the free description type slot B2 of the form data A from the transcription of the recognition result data E based on the degree of similarity of the partial character string similar to the reading of the item name of the free description type slot B2 described in the form template C and the position of the partial character string.

Figure 9:
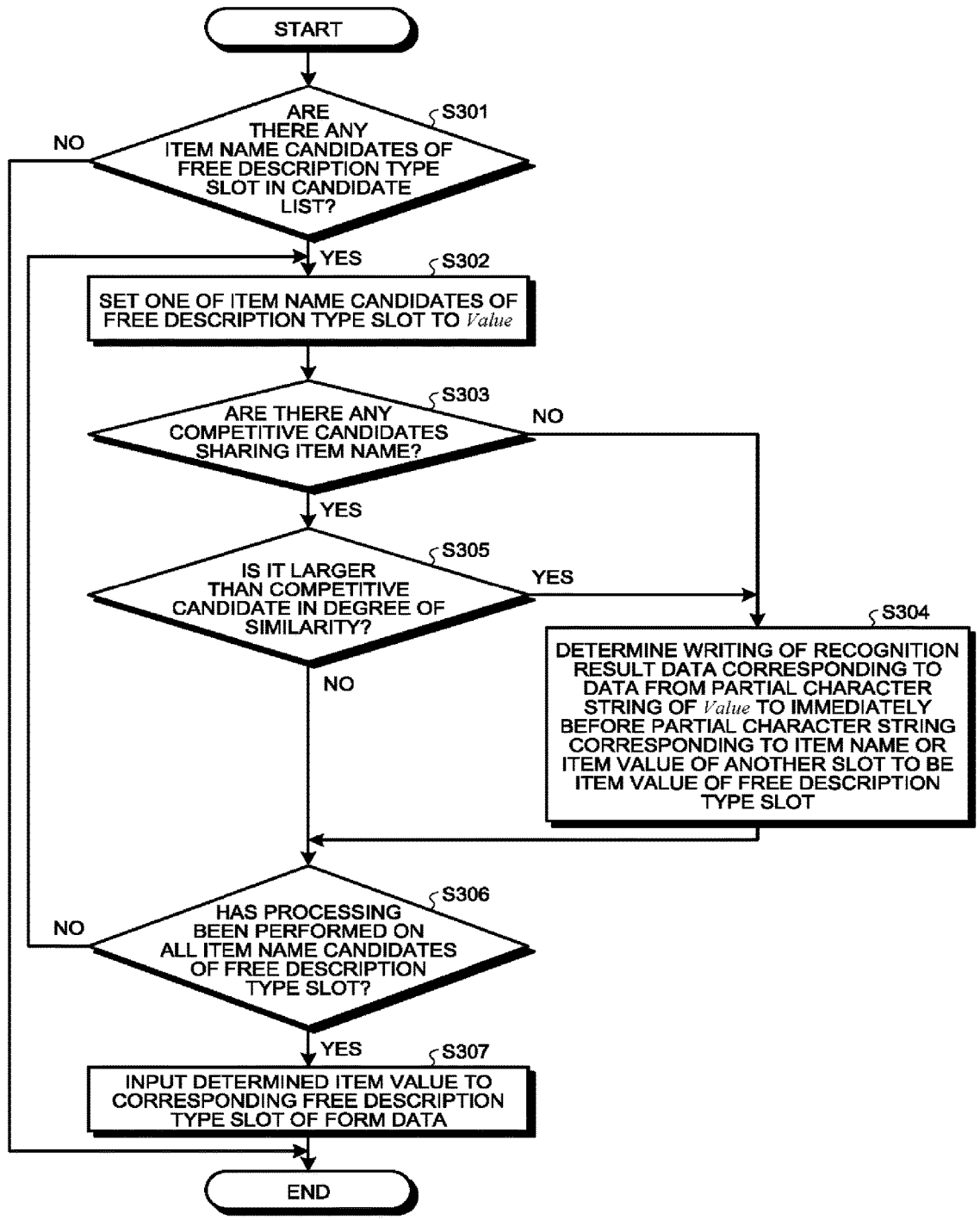
FIG. 9 is a flowchart of an example of a processing procedure by a free description type item value determination unit.

FIG. 9 is a flowchart of an example of a processing procedure by the free description type item value determination unit 43. When the processing illustrated in FIG. 9 starts, the free description type item value determination unit 43 first refers to the slot type of the item name candidates contained in the candidate list F and determines whether there are any item name candidates of the free description type slot B2 in the candidate list F (Step S301). In this process, if there is no item name candidate of the free description type slot B2 in the candidate list F (No at Step S301), the process ends without any further operation.

In contrast, if there are some item name candidates of the free description type slot B2 in the candidate list F (Yes at Step S301), the free description type item value determination unit 43 then sets one of the item name candidates of the free description type slot B2 contained in the candidate list F to a variable Value (Step S302). The free description type item value determination unit 43 then determines whether there are any competitive candidates sharing the item name for the item name candidate of the free description type slot B2 set to Value (Step S303).

If there is no competitive candidate sharing the item name (No at Step S303), the free description type item value determination unit 43 determines the transcription of the recognition result data E corresponding to the data from the partial character string of Value to immediately before the partial character string corresponding to the item name or the item value of another slots B to be the item value of the corresponding free description type slot B2 (Step S304). If there is no partial character string corresponding to the item name or the item value of the other slot B after the partial character string of Value in the reading of the recognition result data E, the transcription of the recognition result data E corresponding to the data from the partial character string of Value to the end of the reading is determined to be the item value of the free description type slot B2.

The item name candidate of the free description type slot B2 contained in the candidate list F illustrated in FIG. 7 is only the item name candidate of the candidate ID "008," for example, and there is no competitive candidate sharing the item name with this item name candidate. In the reading of the recognition result data E, there is no partial character string corresponding to the item name or the item value of the other slot B after the partial character string of the item name candidate of the candidate ID "008" "to-kki-ji-ko-u." Consequently, "TOKKI JIKOU DESU GA, IDOU CHU NI FIRUMUIRI HAIKOU NI TSUMAZUKI KOROBISOU NI NARI MASHITA," which is the transcription of the recognition result data E corresponding to the data from "to-kki-ji-ko-u" to the end of the reading of the recognition result data E is determined to be the item value of the free description type slot B2 of slot No. 4.

In contrast, if there is a competitive candidate sharing the item name (Yes at Step S303), the free description type item value determination unit 43 then determines whether the degree of similarity of Value is larger than the degree of similarity of the competitive candidate (Step S305). If the degree of similarity of Value is larger than the degree of similarity of the competitive candidate (Yes at Step S305), the process advances to Step S304 to determine the transcription of the recognition result data E corresponding to the data from the partial character string of Value to immediately before the partial character string corresponding to the item name or the item value of the other slot B to be the item value of the corresponding free description type slot B2.

In contrast, if the degree of similarity of Value is equal to or smaller than the degree of similarity of the competitive candidate (No at Step S305), the processing on the item name candidate of the free description type slot B2 set to Value ends, and the process advances to Step S306.

Subsequently, the free description type item value determination unit 43 determines whether the processing has been performed on all the item name candidates of the free description type slot B2 contained in the candidate list F (Step S306), and if there are some unprocessed item name candidates of the free description type slot B2 (No at Step S306), the process returns to Step S302 to repeat the subsequent pieces of processing. After performing the pieces of processing from Step S302 to Step S305 on all the item name candidates of the free description type slot B2 contained in the candidate list F (Yes at Step S306), the determined item value is input to the corresponding free description type slot B2 of the form data A (Step S307), and the series of processing illustrated in FIG. 9 ends.

The free description type item value determination unit 43 performs the foregoing processing, whereby "TOKKI JIKOU DESU GA, IDOU CHU NI FIRUMUIRI HAIKOU NI TSUMAZUKI KOROBISOU NI NARI MASHITA" is input as the item value to the free description type slot B2 of slot No. 4 of the form data A as illustrated in FIG. 4, for example.

The processing by the free description type item value determination unit 43 illustrated in FIG. 9 is by way of example and is not limited to this example. The free description type item value determination unit 43 is only required to determine the item value to be input to the free description type slot B2 from the transcription of the recognition result data E based on the degree of similarity of the item name candidate of the free description type slot B2 (the degree of similarity of the partial character string contained in the item name candidate of the free description type slot B2 relative to the item name) and the position of the item name candidate (the offset of the partial character string contained in the item name candidate). In the above-described example, for example, when there is a competitive candidate, if the degree of similarity of Value is larger than the degree of similarity of the competitive candidate, the item value candidate of the free description type slot B2 set to Value is determined to be the item name of free description type slot B2, and the transcription of the recognition result data E corresponding to the data after the partial character string of Value is determined to be the item value of the free description type slot B2. However, even when the degree of similarity of Value is larger than the degree of similarity of the competitive candidate, if there is a partial character string corresponding to the item name or the item value of the other slot B after the partial character string of Value near the partial character string in the reading of the recognition result data E, the competitive candidate may be determined to be the item name of the free description type slot B2, and the transcription of the recognition result data E corresponding to the data after the partial character string of the competitive candidate may be determined to be the item value of the free description type slot B2.

The template management unit 50 creates, edits, or deletes the slot B in the form template C stored by the template storage unit 20 in accordance with template creator's operation to manage the form template C stored by the template storage unit 20. As illustrated in FIG. 5, the template management unit 50 includes a slot type setting unit 51, an item name setting unit 52, and an alternative setting unit 53.

The slot type setting unit 51 sets either the alternative type or the free description type as the type of the slot B for the respective slots B of the form data A. The item name setting unit 52 sets the item names and the readings thereof of the respective slots B of the form data A. The alternative setting unit 53 sets the alternatives of the item value and the readings thereof of the alternative type slot B1 of the form data A.

Figure 10:
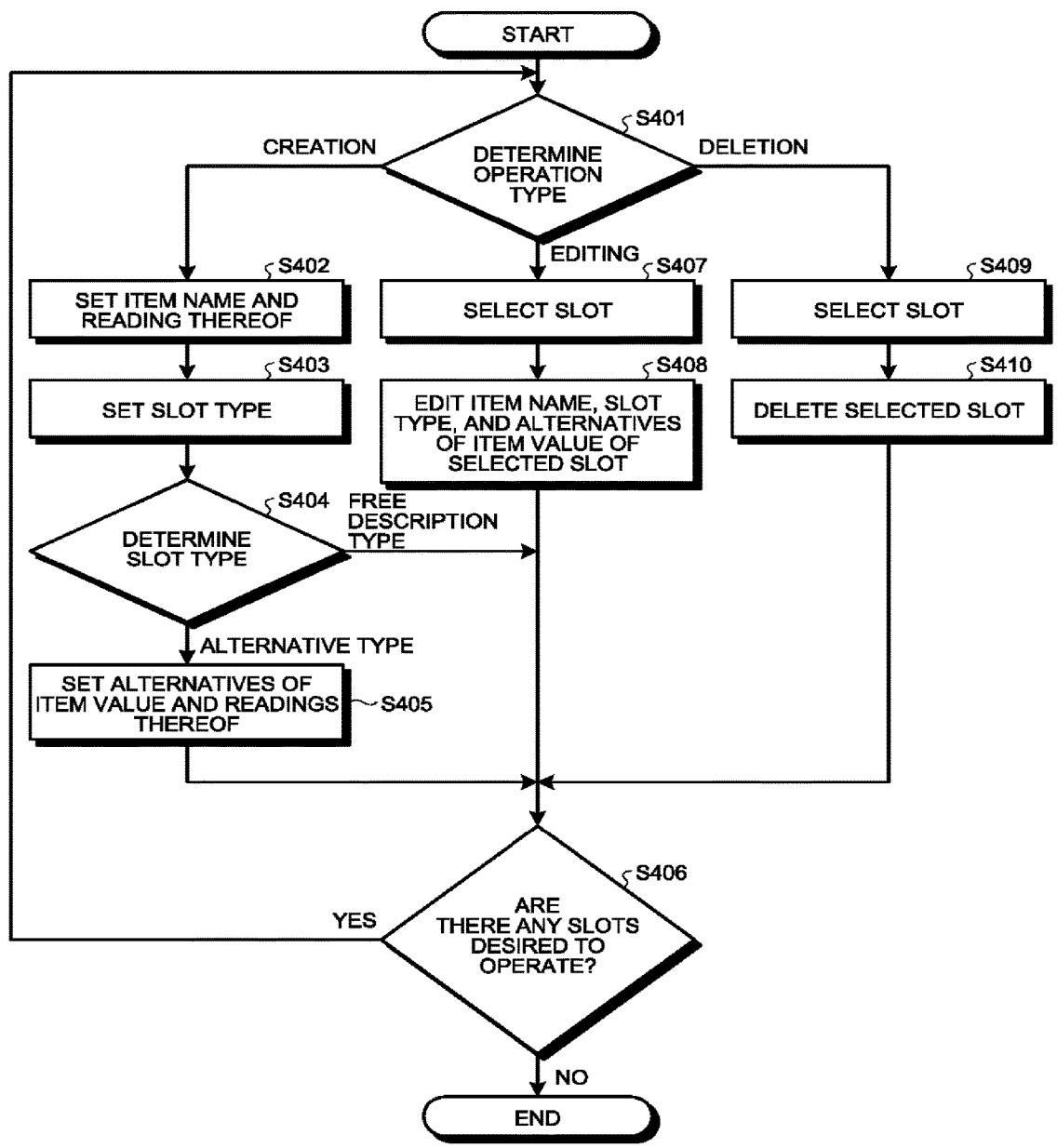
FIG. 10 is a flowchart of an example of a processing procedure by a template management unit.

FIG. 10 is a flowchart of an example of a processing procedure by the template management unit 50. When the processing illustrated in FIG. 10 starts, the template management unit 50 first determines an operation type (one of creation, editing, and deletion of the slot B by the template creator's operation) by the template creator (Step S401). If the operation type is creation of the slot B, the item name setting unit 52 sets the item name and the reading thereof of the slot B to be created in accordance with template creator's operation (Step S402), and the slot type setting unit 51 sets the type of the slot B (Step S403). The type of the slot B to be created is determined to be either the free description type or the alternative type (Step S404); if the slot B to be created is the alternative type slot B1, the alternative setting unit 53 sets the alternatives of the item value and the readings thereof of the alternative type slot B1 in accordance with template creator's operation (Step S405). For the setting of the readings, a reading information generation unit that generates readings from the item names or the alternatives of the item value input by the template creator may be separately provided, and the output of this reading information generation unit may be set. A plurality of readings may be set for one item name or one alternative of the item value.

If the operation type of the template creator is editing of the slot B, the template management unit 50 selects the slot B to be edited (Step S407) and edits the item name of the selected slot B, the type of the slot B, the alternatives of the item value, and the like of the selected slot B in accordance with template creator's operation (Step S408). If the operation type of the template creator is deletion of the slot B, the template management unit 50 selects the slot B to be deleted (Step S409) and deletes the selected slot B in accordance with template creator's operation (Step S410). Although the example to delete the slot B has been described, when the form template C is deleted, the form template C to be deleted may be selected at Step S409.

Subsequently, the template management unit 50 determines whether there are any further slots B that the template creator desires to operate (Step S406). If there is a slot B that the template creator desires to operate (Yes at Step S406), the process returns to Step S401 to repeat the subsequent pieces of processing. If there is no slot B that the template creator desires to operate (No at Step S406), the series of processing illustrated in FIG. 10 ends. The processing by the template management unit 50 illustrated in FIG. 10 is by way of example and is not limited to this example. The template management unit 50 is only required to be able to manage the form template C stored by the template storage unit 20 by performing creation, editing, or deletion of the slot B in the form template C stored by the template storage unit 20 in accordance with template creator's operation.

Effect of Embodiment

As described above in detail with reference to the specific example, the input support apparatus 100 of the present embodiment uses the form template C as the clue information in determining the item values to be input to the respective slots B of the form data A using the recognition result data E obtained by voice recognizing the utterance of the user. Based on the reading of the recognition result data E and the readings of the item names and the alternatives described in the form template C, the item values to be input to the respective slots B of the form data A are determined. Consequently, the input support apparatus 100 of the present embodiment can appropriately determine the item values to be input to the respective slots B of the form data A even when the recognition result data E contains errors. In addition, the user can input appropriate item values to the respective slots of the form data A through relatively flexible utterance not utterance based on rules.

The form template C used as the clue information in the input support apparatus 100 of the present embodiment is only required to set the item names of the respective slots B of the form data A and the alternatives of the item value of the alternative type slot B1 together with the respective readings thereof and does not need any detailed parameter setting about speech recognition as in rule creation in the grammar type speech recognition engine. Consequently, the template creator can easily create the form template C and also makes its management easy without expert knowledge about speech recognition.

In addition, even when the form data A has two types of slots B including the alternative type slot B1 and the free description type slot B2, the input support apparatus 100 of the present embodiment can appropriately determine the respective item values of the alternative type slot B1 and the free description type slot B2 from one time utterance by the user.

First Modification

The embodiment described above is by way of example, and various modifications can be made. In the above-described embodiment, for example, the alternative type item value determination unit 42 determines the item value to be input to the alternative type slot B1 based on at least either the degree of similarity of the item value candidate (the degree of similarity of the partial character string contained in the item value candidate relative to the item value) or the positional relation between the item value candidate and the other item value candidate or the item name candidate (the difference in offset between the partial character strings contained in the respective candidates). In the above-described embodiment, the free description type item value determination unit 43 determines the item value to be input to the free description type slot B2 from the transcription of the recognition result data E based on the degree of similarity of the item name candidate of the free description type slot B2 (the degree of similarity of the partial character string contained in the item name candidate of the free description type slot B2 relative to the item name) and the position of the item name candidate (the offset of the partial character string contained in the item name candidate). However, when item values have already been input to partial slots B of the form data A, the alternative type item value determination unit 42 or the free description type item value determination unit 43 may determine the item value to be input to the alternative type slot B1 or the item value to be input to the free description type slot B2 using an input status of the form data A.

FIG. 11 is a diagram of an example of the form data A in which item values of partial slots B have already been input. FIG. 12 is a diagram of example of the form template C corresponding to the form data A illustrated in FIG. 11. FIG. 13 is a diagram of an example of the recognition result data E for use in the determination of the item value to be input to the slot B of the form data A illustrated in FIG. 11.

In the example illustrated in FIG. 11 to FIG. 13, the processing by the extraction unit 41 extracts "i-chi-ji-ka-n" as a partial character string similar to the item value (alternative) of the alternative type slot B1 of No. 1 "1 JIKAN (ICHI JIKAN)" (which means an hour) from the character string of the reading of the recognition result data E and registers a combination of this item value (alternative) and the partial character string as an item value candidate in the candidate list F. The processing by the extraction unit 41 extracts "i-chi-ji-ka-n" as a partial character string similar to the item value (alternative) of the alternative type slot B1 of No. 2 "ICHIJIGAWA HAIKAN" (which means primary tube) from the character string of the reading of the recognition result data E and registers a combination of this item value (alternative) and the partial character string as an item value candidate in the candidate list F.

In the present modification, when a plurality of item value candidates containing the same partial character string have been registered in the candidate list F as above, the alternative type item value determination unit 42 determines the item value of the alternative type slot B1 of the form data A using not only a comparison in the degree of similarity of these item value candidates or a comparison in the positional relation with another candidate but also the input status of the form data A. When the slot B in which the item value is not input is given priority, for example, the item value candidate corresponding to the item value (alternative) of the alternative type slot B1 of slot No. 1 "1 JIKAN (ICHI JIKAN)" is higher than the item value candidate corresponding to the item value of the alternative type slot B1 of slot No. 2 (ICHIJIGAWA HAIKAN) in the degree of similarity; as illustrated in FIG. 11, the item value of the alternative type slot B1 of slot No. 1 has already been input, whereas the item value of the alternative type slot B1 of slot No. 2 has not been input. Consequently, the alternative type item value determination unit 42 uses the item value candidate corresponding to the item value of the alternative type slot B1 of slot No. 2 (ICHIJIGAWA HAIKAN) to determine the item value of slot No. 2 to be "ICHIJIGAWA HAIKAN."

In the example illustrated in FIG. 11 to FIG. 13, the processing by the extraction unit 41 extracts "chu-u-i" as a partial character string similar to the item name of the free description type slot B2 of slot No. 3 "CHUI JIKOU" (which means precaution) from the character string of the reading of the recognition result data E and registers a combination of this item name and the partial character string as an item name candidate in the candidate list F.

In the present modification, when the item name candidate of the free description type slot B2 as above has been registered in the candidate list F, the free description type item value determination unit 43 determines the item value of the free description type slot B2 of the form data A using not only the degree of similarity or position of the item name candidate but also the input status of the form data A. When the slot B in which the item value is not input is given priority, for example, even when the candidate list F contains an item name candidate corresponding to the free description type slot B2 of slot No. 3, the item value of the free description type slot B2 of slot No. 3 has already been input, and the determination of the item value using this item name candidate is not performed.

Figure 14:
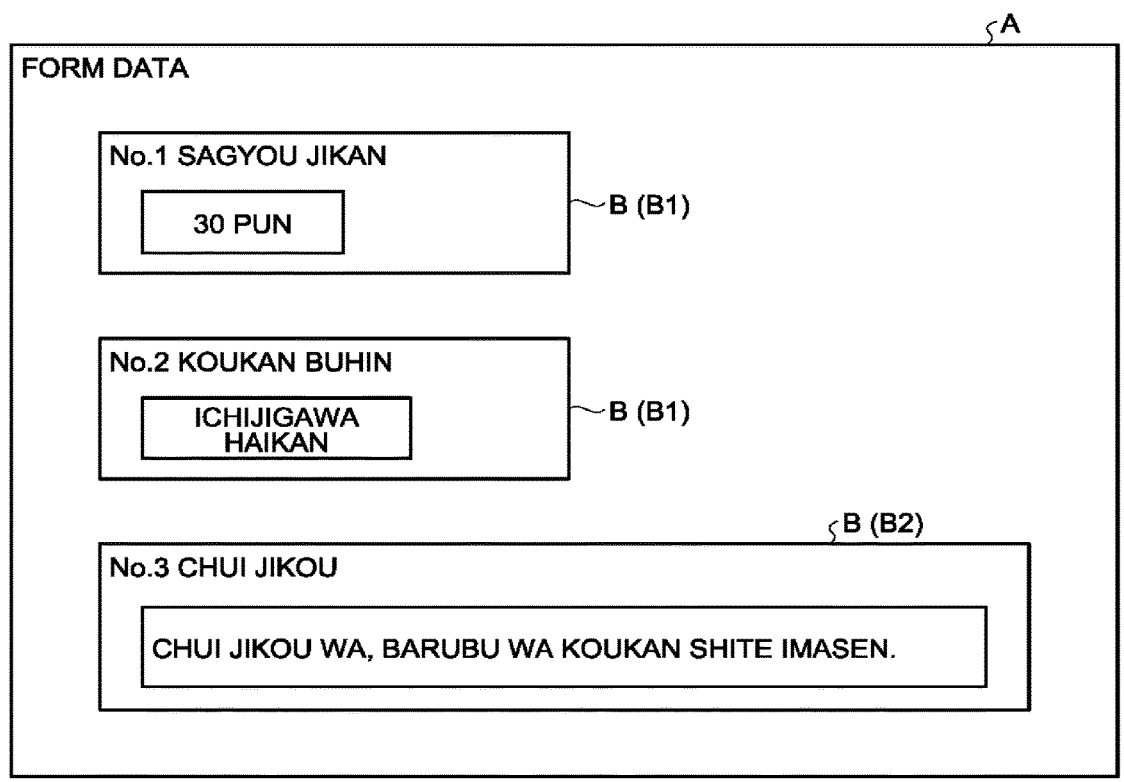
FIG. 14 is a diagram of an example of the form data in which an item value has been input to a blank slot.

FIG. 14 is a diagram of an example of the form data A in which an item value has been input to a blank slot B by the present modification. As compared with the form data A illustrated in FIG. 11, "ICHIJIGAWA HAIKAN" determined by the alternative type item value determination unit 42 has been input as the item value to the alternative type slot B1 of No. 2 in which the item value was not input. Although the example to give priority to the slot B in which the item value is not input has been described, the slot B in which the item value has already been input may be given priority considering that it is important to update the slot B in which the item value has already been input based on utterance input later.

As above, in the present modification, when item values have already been input to the partial slots B of the form data A, the alternative type item value determination unit 42 or the free description type item value determination unit 43 determines the item value of the alternative type slot B1 or the item value of the free description type slot B2 also using the input status of the form data A. Consequently, the present modification can further appropriately determine the item values to be input to the respective slots B of the form data A.

Although the above assumes the example that uses the input status of the form data A in addition to the degree of similarity or position of the item value candidate, when the candidate list F contains only one item value candidate of a slot B, for example, if the item value of the slot B in the form data A is not input, the item value of the blank slot B is determined using the item value candidate; thus without using the degree of similarity or position of the item value candidate, based on the item value candidate contained in the candidate list F and the input status of the form data A, the item value to be input to the slot B of the form data A may be determined.

Second Modification

When the form template C describes supplementary information apart from the above-described information on the item names of the respective slots B and the alternatives of the item value and the readings thereof, the type of the slot B, and the like, the alternative type item value determination unit 42 or the free description type item value determination unit 43 may determine the item value to be input to the alternative type slot B1 or the item value to be input to the free description type slot B2 using the supplementary information described in the form template C.

Examples of the supplementary information described in the form template C include a priority input flag to be added to a high-priority slot B. This priority input flag indicates that the item value should be input to the slot B with priority given thereto. When the priority input flag is added to the alternative type slot B1, the alternative type item value determination unit 42 determines the item value of the alternative type slot B1 with the priority input flag added with priority given thereto. When the priority input flag is added to the free description type slot B2, the free description type item value determination unit 43 determines the item value of the free description type slot B2 with the priority input flag added with priority given thereto.

Other examples of the supplementary information described in the form template C include information on the order of arrangement of the slots B in the form data A. In this case, the alternative type item value determination unit 42 or the free description type item value determination unit 43 determines the item value of the alternative type slot B1 or the item value of the free description type slot B2 while considering the respective orders of arrangement of the item value candidates and the item name candidates registered in the candidate list F by the extraction unit 41 in the form data A.

As above, in the present modification, when the form template C describes the supplementary information, the alternative type item value determination unit 42 or the free description type item value determination unit 43 determines the item value of the alternative type slot B1 or the item value of the free description type slot B2 also using the supplementary information described in the form template C. Consequently, the present modification can further appropriately determine the item values to be input to the respective slots B of the form data A.

Although the above assumes the example that uses the supplementary information described in the form template C in addition to the degree of similarity or position of the item value candidate, the item value to be input to the slot B of the form data A may be determined based on the item value candidate contained in the candidate list F and the supplementary information described in the form template C without using the degree of similarity or position of the item value candidate.

Third Modification

In the above-described embodiment, on the assumption that the form data A has a form containing both the alternative type slot B1 and the free description type slot B2, described is the input support apparatus 100 including both the alternative type item value determination unit 42 that determines the item value to be input to the alternative type slot B1 and the free description type item value determination unit 43 that determines the item value to be input to the free description type slot B2. However, when the form data A with a form that does not contain the free description type slot B2 is an object to be processed, the input support apparatus 100 does not necessarily include the free description type item value determination unit 43.

Supplementary Description

The input support apparatus 100 of the present embodiment can be implemented through cooperation of hardware forming a general computer and a computer program (software) executed by the computer, for example. The computer can execute a certain computer program, for example, thereby implementing the acquisition unit 30, the determination unit 40 (the extraction unit 41, the alternative type item value determination unit 42, and the free description type item value determination unit 43), and the template management unit 50 (the slot type setting unit 51, the item name setting unit 52, and the alternative setting unit 53). A mass storage included in the computer can be used, thereby implementing the form data storage unit 10 and the template storage unit 20.

Figure 15:
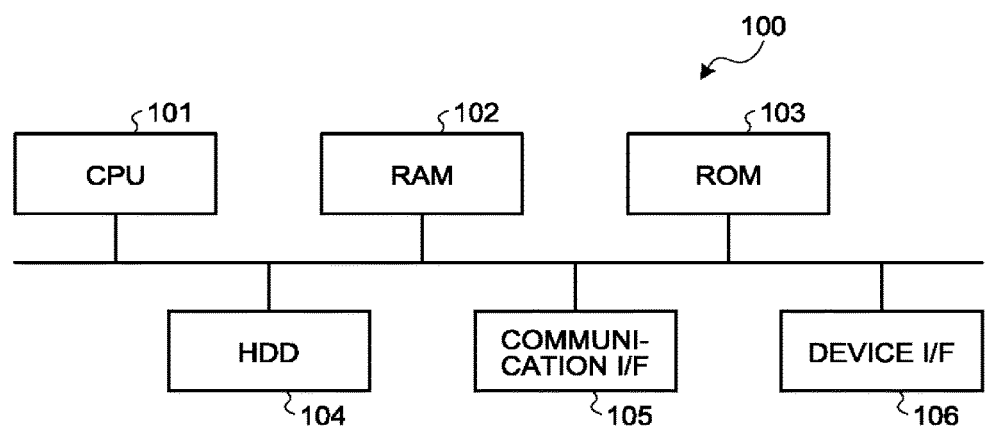
FIG. 15 is a block diagram of a hardware configuration example of the input support apparatus.

FIG. 15 is a block diagram of a hardware configuration example of the input support apparatus 100 of the present embodiment. As illustrated in FIG. 15, for example, the input support apparatus 100 has a hardware configuration as a normal computer including a hardware processor such as a central processing unit (CPU) 101, storages such as a random access memory (RAM) 102 and read-only memory (ROM) 103, a mass storage such as a hard disk drive (HDD) 104, a communication interface (I/F) 105 that performs communication with the outside via a network, and a device I/F 106 to which peripherals are connected.

The computer program is recorded in a computer-readable recording medium such as a magnetic disc, an optical disc, a semiconductor memory, or other type of recording media similar thereto, which may be provided as a computer program product. The recording medium recording the computer program may have any recording form so long as it is a recording medium that can be read by a computer system. The computer program may be installed in the computer in advance, or the computer program distributed via a network may be installed in the computer as appropriate.

The computer program executed by the computer has a module structure including functional components such as the acquisition unit 30, the determination unit 40 (the extraction unit 41, the alternative type item value determination unit 42, and the free description type item value determination unit 43), and the template management unit 50 (the slot type setting unit 51, the item name setting unit 52, and the alternative setting unit 53); the processor reads and executes this computer program as appropriate, thereby generating the components on a main storage such as the RAM 102.

In the input support apparatus 100 of the present embodiment, part or the whole of the functional components may be implemented by exclusive hardware such as an application specific integrated circuit (ASIC) or a field-programmable gate array (FPGA).

The input support apparatus 100 of the present embodiment may be configured as a network system in which a plurality of computers are communicably connected to each other to implement the above-described components in such a manner as being distributed to the computers. The input support apparatus 100 of the present embodiment may be a virtual machine operating on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An input support apparatus comprising:
  a mass storage device configured to store a form template that is a template for form data having one or more slots to which item values are input, the form template describing item names of the respective slots and alternatives of an item of an alternative type slot together with respective readings thereof, the alternative type slot being a slot in which the item value selected from the alternatives is input; and
  processing circuitry configured to:
    acquire recognition result data obtained by speech recognition performed on utterance of a user, the recognition result data containing a transcription and a reading;

extract a first partial character string and a second partial character string from a character string of the reading of the recognition result data, the first partial character string being a character string similar to the reading of one of the alternatives described in the form template, the second partial character string being a character string similar to the reading of one of the item names described in the form template; and determine based on a positional relation between the first partial character string and the second partial character string in the character string of the reading of the recognition result data, whether to select the one of the alternatives similar to the first partial character string as an item value of the alternative type slot.

2. The input support apparatus according to claim 1, wherein the processing circuitry determines, further based on a degree of similarity of the first partial character string to the reading of the one of the alternatives, whether to select the one of the alternatives similar to the first partial character string as the item value of the alternative type slot.

3. The input support apparatus according to claim 1, wherein the processing circuitry determines, further based on an input status of the form data with an item value having been input to part of the slots of the form data, whether to select the one of the alternatives similar to the first partial character string as the item value of the alternative type slot.

4. The input support apparatus according to claim 1, wherein the processing circuitry determines, further based on supplementary information described in the template, whether to select the one of the alternatives similar to the first partial character string as the item value of the alternative type slot.

5. The input support apparatus according to claim 1, wherein the processing circuitry further determines an item value to be input to a free description type slot in which an item value is freely written from the transcription of the recognition result data, based on a degree of similarity of the second partial character string similar to a reading of an item name of the free description type slot and a position of the second partial character string in the character string of the reading of the recognition result data.

6. The input support apparatus according to claim wherein the processing circuitry further determines an item value to be input to a free description type slot in which an item value is freely written, based on the second partial character string similar to a reading of an item name of the free description type slot and an input status of the form data with an item value having been input to part of the slots of the form data.

7. The input support apparatus according to claim 1, wherein the processing circuitry further determines an item value to be input to a free description type slot in which an item value is freely written, based on the second partial character string similar to a reading of an item name of the free description type slot and supplementary information described in the template.

8. The input support apparatus according to claim 1, wherein the processing circuitry is further configured to manage the form template, and further configured to:

for each of the slots of the form data, set either an alternative type or a free description type as a slot type;

set an item name and a reading thereof of each of the slots of the form data; and set alternatives of an item value and readings thereof of the alternative type slot of the form data.

9. A non-transitory computer-readable medium containing instructions to be executed by a computer, the computer comprising a mass storage device configured to store a form template that is a template for form data having one or more slots to which item values are input, the form template describing item names of the respective slots and alternatives of an item value of an alternative type slot together with respective readings thereof, the alternative type slot being a slot in which the item value selected from the alternatives is input, the instructions, when executed by the computer, cause the computer to perform a method comprising:

acquiring recognition result data obtained by speech recognition performed on utterance of a user, the recognition result data containing a transcription and a reading;

extracting a first partial character string and a second partial character string from a character string of the reading of the recognition result data, the first partial character string being a character string similar to the reading of one of the alternatives described in the form template, the second partial character string being a character string similar to the reading of one of the item names described in the form template; and determining, based on a positional relation between the first partial character string and the second partial character string in the character string of the reading of the recognition result data, whether to select the one of the alternatives similar to the first partial character string as an item value of the alternative type slot.

* * * * *